May 19, 1942.  F. NALLINGER  2,283,644
CONTROL SYSTEM
Filed June 22, 1938  2 Sheets-Sheet 1

Fritz Nallinger
  Inventor:

By [signature]
  his ATTY.

Inventor,
FRITZ NALLINGER.
by his Atty.

Patented May 19, 1942

2,283,644

UNITED STATES PATENT OFFICE 2,283,644

CONTROL SYSTEM

Fritz Nallinger, Stuttgart, Germany, assignor to Daimler-Benz Aktiengesellschaft, Stuttgart-Unterturkheim, Germany Application June 22, 1938, Serial No. 215,305
In Germany June 26, 1937

9 Claims. (Cl. 123—119)

This invention relates to an arrangement for regulating a charging blower driven by a variable coupling of the kinetic type, such as a hydraulic or an eddy current coupling for internal combustion engines and has for its object to attain a steady and continuous regulation of the coupling and of the charging blower driven thereby.

The direct regulation of a charging blower variably driven by an oil-hydraulic coupling often causes difficulties as, owing to the change in the number of revolutions of the coupling which only act slowly, a detrimental fluctuation of the number of revolutions and of the efficiency of the coupling and of the charging blower takes place.

To avoid this objection a control gear influencing by mechanical means, e. g., by a rod system or a cam disc the hydraulic coupling for the variable drive of the charging blower is, according to the invention, combined with the regulating valve in such a manner that, after a short time, the necessary correct quantity of oil for the coupling and consequently the correct number of rotations for the charging blower are adjusted. At the same time the control gear influencing the regulating coupling is connected by means which are adapted to grip and allow a play in the direction of the movement, e. g., a gripper or a loop or cam disc engagement piece to the regulating valve arranged in the pressure conduit of the charging blower, so that the regulating valve has a certain idle path between the open and closed positions for effecting the regulation.

If the valve exceeds this path it changes for example the quantity of oil flowing to the coupling, for example by means of the loop or cam disc engagement piece, or the like and of a control piston or adjustable valve or slide valve connected therewith. The smaller quantity of oil flowing to the coupling now results in a reduction in the number of rotations of the charging blower and it reopens the regulating valve, which first moves freely in the loop or cam disc engagement so that the quantity of oil is not changed.

If the wider opening of the valve is still insufficient to establish the necessary charging pressure more oil is allowed to pass to the coupling towards the end of the path of the throttle valve by the engagement of the control gear. After a short time the necessary correct quantity of oil and consequently the correct number of revolutions of the charging blower will be adjusted.

Preferably the loop disc engagement piece is of such shape that it allows a movement of the control member only in the ranges in neighbourhood of the extreme positions.

In order to maintain the control gear in the intermediate positions, the rod system of the control gear is provided with a braking device so that, during the movement of the regulating valve within the loop, the quantity of oil is not changed.

Instead of hydraulic coupling also an eddy current coupling may be used. The regulating then takes place by means of a regulating resistance connected in the circuit; the regulating resistance is actuated by the control member, which in the case of the hydraulic coupling actuates the control gear, viz., control piston. The slip contact of the resistance is then freely movable along a portion of its path in the loop disc engagement piece. Instead of the variable resistance a coal pressure regulator may be used.

An embodiment of the invention is illustrated diagrammatically in the accompanying drawings, in which Fig. 1 shows a general view with the regulating valve closed.

The charging blower $b$ is driven by the internal combustion engine $a$ through the intermediary of a hydraulic coupling $c$. The fuel feed to the working cylinder of the internal combustion engine $a$ is effected for example by an injection pump $d$ driven by the main shaft $u$ of the internal combustion engine $a$. The air supplied by the charging blower $b$ is fed to the internal combustion engine $a$ through the conduit $g$ in which a regulating valve $e$ is arranged. This regulating valve $e$ is actuated by a charging pressure regulator $f$, for example a diaphragm pressure regulator, connected to the air feed pipe $g$ by the conduit $h$.

The filling of the hydraulic coupling $c$, which is connected on the primary side to the main shaft $u$ and whose secondary part drives the charging blower $b$ through the intermediary of the shaft $w$, is effected by the pumps $y$ and $z$ provided with a suction conduit $m$, which pumps are in turn driven by the main shaft $u$ through the intermediary of bevel wheels $s$, $t$ and a shaft $x$. Whereas the pump $y$, whose delivery is sufficient for the minimum filling of the coupling $c$, forces the operating liquid directly through the conduit $k$ to the coupling $c$, the pump $z$ delivers to the charge conduit $k$ through the conduit $i$ over the control gear $p$. The conduit $i$ is provided with an overflow valve $o$ which, when the control gear is closed, allows the liquid supplied to flow back into the reservoir $n$ through the conduit $l$. The liquid delivered jointly by the two pumps $y$, $z$, effects a complete filling and therefore the maximum transmitting capacity of the coupling $c$ with a speed ratio of 1:1 between the driving and driven shafts $u$ and $w$ respectively.

The control gear $p$ is connected with the regulating valve $e$ by a slot guide $v$ in the rod system $q$ and is arranged between the conduits $i$ and $k$ for dosing the quantity of liquid delivered by the pump $z$ to the coupling $c$ and consequently to the device for regulating the speed of the charging blower or for changing the charging pressure. The rod system $q$ of the control piston $p$ is held in its intermediate positions for example by a spring brake $r$.

Figure 1:
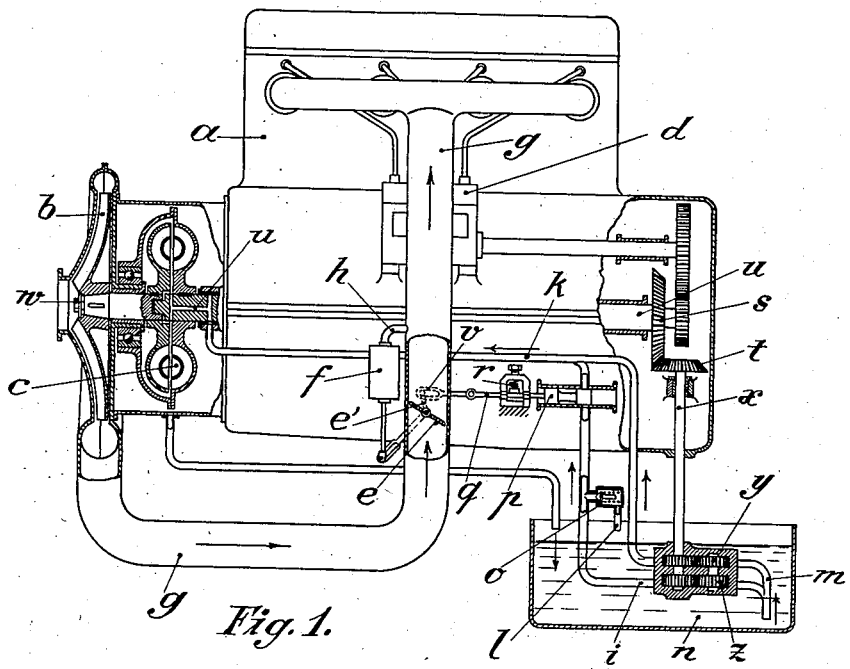

In Fig. 1 the regulating valve $e$ is entirely closed and the control piston $p$ is pulled towards the left by the rod system $e$ connected with the regulating valve $e$, so that the pressure conduit $i$ of the pump $z$ is closed and the delivery for this pump flows back to the reservoir $n$ through the by-pass valve $o$ and conduit $l$. The coupling $c$ operates only with the part filling delivered by the pump $y$ and the charging blower $b$ with correspondingly reduced pressure.

Figure 2:
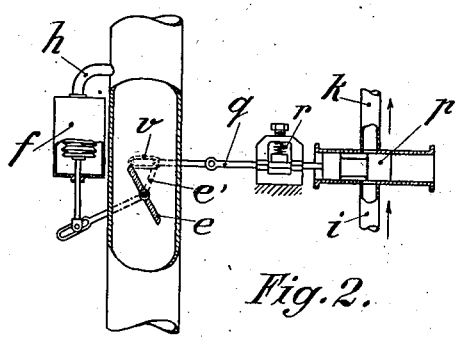
Fig. 2 shows the arrangement with regulating valve partly opened.

Fig. 2 shows the arrangement with partly open regulating valve $e$, the rod system $e'$ having performed the idle movement in the slot guide $v$ and shifted the control piston slightly towards the right so that the pressure flow from the conduit $i$ to the conduit $k$ is gradually increased as the regulating valve $e$ opens wider and the transmitting capacity of the coupling $c$ and the charging pressure of the charging blower $b$ are increased.

Figure 3:
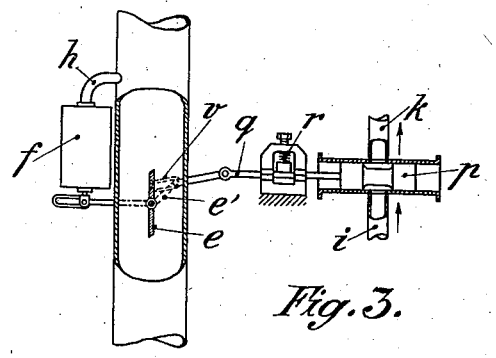
Fig. 3 shows the arrangement with regulating valve fully opened.

Fig. 3 shows the fully open regulating valve $e$, the control piston $p$ having entirely exposed the conduit $i$, $k$, so that the two pumps $y$ and $z$ fill the coupling $c$ and the charging blower $b$ gives the maximum charging pressure.

If the regulating valve $e$ closes, the control piston $p$ will be pulled towards the left by the rod system $e'$, $q$ after having travelled along its idle path in the slot guide $v$, and closes the pressure conduit $i$ of the pump $z$, as shown in Fig. 1.

Figure 4:
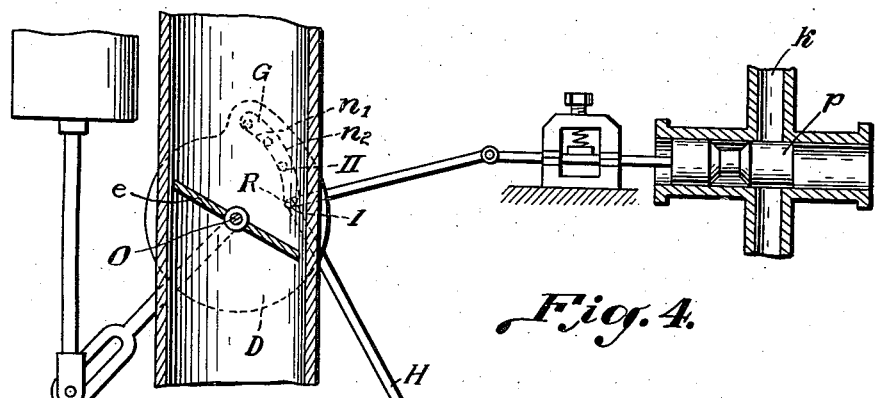
Fig. 4 illustrates a modified form of construction, the air and fluid valves being shown in closed position.
Figure 5:
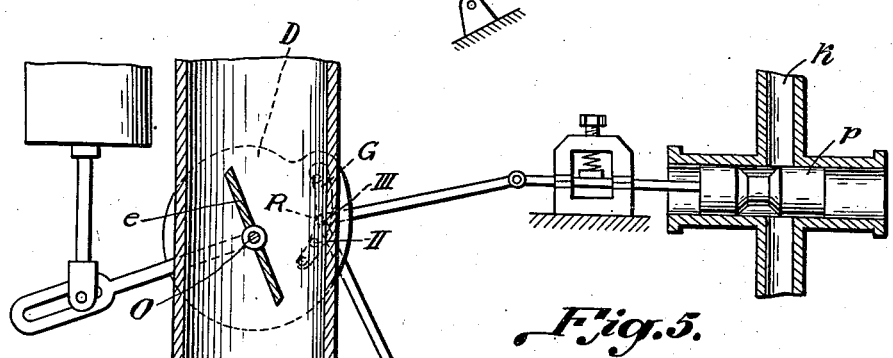
Fig. 5 illustrates the modification shown in Fig. 4 with the air and fluid valves in partly open positions.
Figure 6:
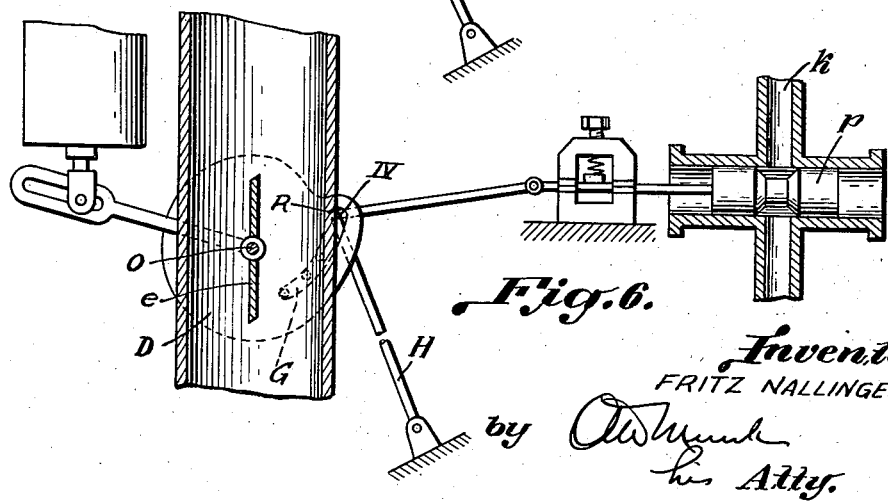
Fig. 6 illustrates the modification shown in Fig. 4 with the air and fluid valves in fully opened positions.

Instead of using a pin and slot connection, a cam disc arrangement may be used to produce the "idle movement," as shown for example in Figs. 4 to 6.

Fig. 4 illustrates the cam disc arrangement in the closed position of the air valve $e$. Fig. 5 shows the same device in the position of the cam disc D in which the fluid valve piston $p$ starts to admit liquid to the coupling. Fig. 6 illustrates the device in the full open position of the air valve $e$ and the full open position of the fluid valve piston $p$.

According to this construction the cam disc D is provided with a guiding groove or recess G of predetermined shape and width. The lever H, which regulates the control movement of the fluid valve device (piston $p$), is provided with a guiding pin R or a guiding roller engaging the groove G of the cam disc. The guiding pin R follows either the edge $n_1$ or edge $n_2$ of the groove G of the cam disc D depending upon the direction of the movement of the air valve $e$.

The drawings illustrate the course of movement during the opening of the air valve $e$. In Fig. 4 the air valve $e$ as well as the fluid valve piston $p$ leading to the coupling are entirely closed. The guiding pin R is in starting position I.

When the air valve $e$ opens, the guiding pin R will slide along the edge $n_1$ of the cam groove G which edge is closer to the center of the cam disc O than is edge $n_2$. In the first part of this movement of the guiding pin R from position I to position II, it describes an arc about the center O. As a result, the fluid control valve piston $p$ remains in rest position. The air control valve $e$ thus performs an idle movement. From position II the guiding pin R continues through the irregularly curved part of the guiding groove G (position III Fig. 5), whereby lever H is moved and the fluid control valve piston $p$ opens the conduit $k$ to admit a corresponding amount of liquid to the coupling. When the air valve $e$ opens further, the inner edge $n_1$, due to its steep shape, opens the conduit $k$ further until its entire cross-sectional area is opened to admit the maximum flow of liquid therethrough. This position is reached at the highest point IV of the guiding groove G. If in this position, or in any other position between II and IV, the air valve $e$ moves toward its closing position, the guiding pin R and the entire fluid valve device $p$ remain unaffected up to the moment when, due to the predetermined width of the guiding groove G, the guiding pin R abuts against the second, outwardly disposed edge $n_2$ of the groove G. The guiding pin R then slides along edge $n_2$ and on a further closing movement of the air valve $e$ it finally returns to its initial position. In this case, the path of the air valve $e$ from the point of contact of the guiding pin R with the inner edge $n_1$ of the guiding groove G to the point of contact with the outer edge $n_2$ constitutes the length of the idle movement.

From this description it will be seen that the operation of the cam disc D agrees in all details with the pin and loop construction $v$, $e'$ according to Figs. 1 to 3.

I claim:

1. In a system of the character described, a blower, a motor, a fluid actuated coupling interconnecting said motor and blower, conveying means for delivering a fluid to said coupling, air conveying means connected to the output side of said blower, air control means for regulating the rate of air passing through said air conveying means, said air control means being disposed in said air conveying means at a point between said blower and said motor, pressure responsive means connected to said air conveying means and said air control means, control means for said fluid associated with the said fluid conveying means, connecting means interconnecting said air and fluid control means, said air control means comprising an actuating element and said connecting means comprising a coacting element, said actuating element and coacting element being operatively connected and cooperating to impart movement to said fluid control means, said actuating element and coacting element being capable of a predetermined idle relative movement with respect to each other, whereby, upon change of pressure in said air conveying means, said pressure responsive means actuates first said air control means and said actuating element, whereupon the latter moves idly for a predetermined distance before affecting the said coacting element and said fluid control means.

2. The system claimed in claim 1, in which said coacting element comprises a loop member, and said fluid control means comprises a control piston, the latter being disposed in said fluid conveying means; said actuating element cooperating with the said loop member to actuate said control piston.

3. The system claimed in claim 1, including a pump connected to said fluid conveying means, said pump supplying liquid to the said coupling, the amount of liquid supplied to the coupling controlling the transmitting power of the same; the said fluid control means including a control piston, the latter being disposed in said fluid conveying means and varying the flow of liquid therethrough; said connecting means comprising levers connected to said piston and a loop member connected to said levers, said actuating means cooperating with said loop member and performing the said predetermined idle movement with respect thereto for the purposes described.

4. The system claimed in claim 1, including a pump connected to said fluid conveying means, said pump supplying liquid to the said coupling, the amount of liquid supplied to the coupling controlling the transmitting power of the same; the said fluid control means including a control piston, the latter being disposed in said fluid conveying means and varying the flow of liquid therethrough; said connecting means comprising levers connected to said piston and a loop member connected to said levers, said actuating means cooperating with said loop member and performing the said predetermined idle movement with respect thereto for the purposes described; said loop member being so dimensioned with respect to the said actuating element that operative movement is transmitted to the loop member only in the range of the extreme positions of the said air control means.

5. The system claimed in claim 1, including a pump connected to said fluid conveying means, said pump supplying liquid to the said coupling, the amount of liquid supplied to the coupling controlling the transmitting power of the same; the said fluid control means including a control piston; the latter being disposed in said fluid conveying means and varying the flow of liquid therethrough; said connecting means comprising levers connected to said piston and a loop member connected to said levers, said actuating means cooperating with said loop member and performing the said predetermined idle movement with respect thereto for the purposes described; said loop member being so dimensioned with respect to the said actuating element that operative movement is transmitted to the loop member only in the range of the extreme positions of the said air control means; and a brake operatively connected to said levers, whereby the latter and the piston connected thereto are held in position during the said idle movement of said actuating element.

6. A control system comprising a fluid actuated coupling for transmitting power, fluid conveying means delivering fluid to said coupling, fluid control means associated with said conveying means and controlling the flow of fluid to said coupling to vary the rate of power transmission, means operated by said coupling, first control means automatically actuated in accordance with the power transmitted by said coupling, second control means controlling the said coupling operated means, said control means including an actuating element in movable operative engagement with said fluid control means, the latter being actuated by said actuating element; the said actuating element being capable of a predetermined idle movement with respect to said fluid control means, whereby delayed action of said actuating element upon said fluid control means is obtained.

7. An internal combustion engine suitable for airplanes, comprising a fluid actuated coupling connected to the engine, a blower connected to said coupling, a conduit connected to the output side of the blower and leading to said engine, conveying means connected to said coupling, a pump connected to said conveying means for supplying fluid to said coupling, and first valve means associated with said conveying means, in combination with a pressure responsive device connected to said conduit and actuated in dependence upon the pressure in said conduit, second valve means disposed in said conduit and connected to said pressure responsive device, an actuating element provided on said second valve means and coacting means connected to said first valve means, said actuating element and said coacting means being disposed for cooperation with each other and being adapted to perform a predetermined idle movement with respect to each other, whereby changes in the pressure output of said blower cause automatic changes in said pressure responsive means, the latter affecting first the second valve means and, after said predetermined idle movement, said first valve means are actuated, whereby a high degree of operating steadiness in the relationship of engine, blower and coupling is produced.

8. The device claimed in claim 7, in which said pressure responsive means is connected to said conduit between said second valve means and the engine, whereby the pressure prevailing at a point between said second valve means and said engine is used for control purposes.

9. The system claimed in claim 1, in which said actuating element comprises a cam disc, and said fluid control means comprises a control piston, the latter being disposed in said fluid conveying means; said coacting element comprises a cam follower, the latter cooperating with said cam disc to actuate said control piston.

FRITZ NALLINGER.